United States Patent [19]
Miller et al.

[11] Patent Number: 5,159,542
[45] Date of Patent: Oct. 27, 1992

[54] SELECTABLE HYSTERESIS CONTROLLER FOR PULSE WIDTH MODULATED INVERTER

[75] Inventors: John M. Miller, Saline; John R. Grabowski, Dearborn, both of Mich.

[73] Assignee: Ford Motor Company, Dearborn, Mich.

[21] Appl. No.: 787,805

[22] Filed: Nov. 4, 1991

[51] Int. Cl.⁵ .............................................. H03K 17/51
[52] U.S. Cl. ......................................... 363/41; 363/95; 363/98
[58] Field of Search ........................ 363/41, 95, 96, 98

[56] References Cited

U.S. PATENT DOCUMENTS

| | | | |
|---|---|---|---|
| 4,489,371 | 12/1984 | Kernick | 363/41 |
| 4,494,051 | 11/1985 | Bailey | 318/254 |
| 4,528,486 | 7/1985 | Flaig et al. | 318/254 |
| 4,546,293 | 10/1985 | Peterson et al. | 318/254 |
| 4,648,022 | 3/1987 | Schauder | 363/159 |
| 4,743,815 | 5/1988 | Gee et al. | 318/254 |
| 4,763,049 | 8/1988 | Magee | 318/254 |
| 5,010,291 | 4/1991 | Edwards | 363/95 |
| 5,027,048 | 6/1991 | Masrur et al. | 318/806 |
| 5,111,374 | 5/1992 | Lai et al. | 363/98 |

OTHER PUBLICATIONS

Development of Induction Motor Drive System for High Performance Electric Vehicles, Toyota Central Research, and Development Laboratories, Inc., by Y. Inaguma et al.

Study and Implementation of Hysteresis Controlled Inverter on a Permanent Magnet Synchronous Machine, by La Joie-Mazerc et al., Mar./Apr. 1985, IEEE Transactions on Industry Applications, vol. IA-21, No. 2.

Current Control of VSI-PWM Inverters, IEEE Transactions on Industry Application, vol. IA-21, No. 4, by David M. Brod et al., May/Jun 1985.

Primary Examiner—Steven L. Stephan
Assistant Examiner—Jeffery Sterrett
Attorney, Agent, or Firm—Mark L. Mollon; Roger L. May

[57] ABSTRACT

A current mode hysteresis controller for an inverter circuit provides selectable hysteresis bands based on the level of current to be provided. In the preferred embodiment of the controller, selected upper and lower limits are provided with hysteresis band switching being performed by selecting the amplification factor of error signals used to control the current mode hysteresis controller.

7 Claims, 4 Drawing Sheets

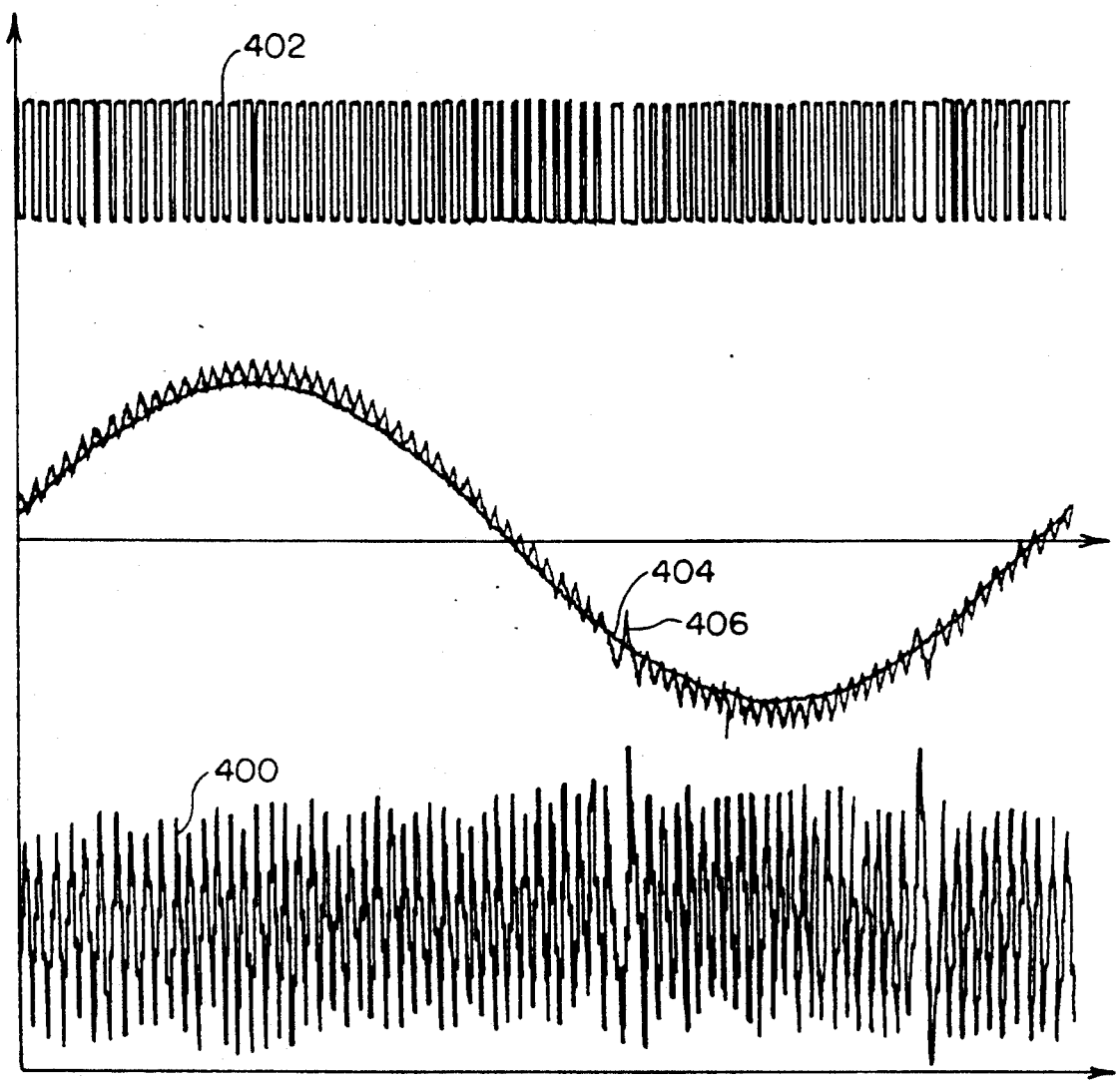

SELECTABLE HYSTERESIS CONTROLLER FOR PULSE WIDTH MODULATED INVERTER

BACKGROUND OF THE INVENTION

The present invention relates generally to current mode hysteresis controllers used, for example, to control alternating current (AC) motors that are powered through static inverters by direct current (DC) power sources such as batteries or rectified AC power and, more particularly, to current band control within such controllers. While the present invention is generally applicable to controlling inverters for example to drive single phase motors and two phase motors, it will be described herein with reference to the control of a three phase motor for which it is being initially applied.

AC motors in comparison to DC motors are generally of simpler structure and include advantages of lower cost, more compact size, less weight and operation at higher speeds and efficiencies. However, controllers for AC motors have been complex and expensive which has hampered the adoption of AC motors for use with DC supplies such as batteries and in particular for applications in motor vehicles. Simplification of AC motor controllers has resulted from the use of current mode controllers.

For current mode control, the current flowing into motor terminals is measured and compared to reference current signals which are generated by a motor controller and are representative of desired current for the motor to effect desired operating conditions. Error signals resulting from the comparison are used to switch semiconductor elements of an inverter circuit which provides power to the motor. Pulse width modulated (PWM) DC power is thus rapidly switched to the terminals of the motor.

One popular form of current mode control uses hysteresis comparators. In hysteresis current mode control, the actual currents within a motor are maintained within a band of given amplitude centered on reference currents which are representative of desired current levels within the motor. An example of hysteresis current mode control for use in a motor vehicle and in particular to control an electrically powered active suspension for a vehicle is disclosed in U.S. Pat. No. 5,027,048 which issued to Masrur et al on Jun. 25, 1991, is assigned to Ford Motor Company and is incorporated herein by reference. The hysteresis motor controller of the Masrur et al patent also discloses use of field oriented control which is another important improvement in the control of AC motors.

A problem encountered in hysteresis current mode control is the selection of the hysteresis band. The bandwidth of the hysteresis band is selected to provide adequate control of the current level and also to minimize inverter losses. For steady-state operation at current levels greater than the hysteresis band, selection of the bandwidth is no problem. However, if current levels vary, a compromise selection must be made. Even for a compromise bandwidth, in applications such as an active suspension, reference current levels can frequently go below the hysteresis band such that the inverter is coasting, modulation disappears and road disturbances are not compensated by the suspension system.

Accordingly, there is a need for an improved current mode hysteresis controller to substantially reduce inverter coasting while still providing high efficiency tightly controlled system operation.

SUMMARY OF THE INVENTION

This need is met by the method and apparatus of the present invention wherein a current mode hysteresis controller is provided with selectable hysteresis bands based on the level of current to be provided. While multiple hysteresis bands can be provided for the present invention by directly selecting the upper and lower limits of the bands, it is preferred to provide a selected upper limit and a selected lower limit with hysteresis band switching being performed by selecting the amplification factor of error signals used to control the current mode hysteresis controller.

In accordance with one aspect of the present invention, a current mode hysteresis controller for controlling a pulse width modulated inverter in response to desired and sensed inverter output currents comprises first comparator means for comparing the desired and sensed inverter output currents to one another to generate error signals representative of the differences therebetween. Second comparator means are provide to receive the error signals and compare them to upper and lower limits of a selected hysteresis band. The second comparator means switches the state of an output signal whenever the signals reach the boundaries of the selected hysteresis band. Current band control means define at least two hysteresis bands for the second comparator means with selector means being provided for selecting the selected hysteresis band from the at least two hysteresis bands. Preferably, the current band control means comprises selectable gain amplifier means for receiving and amplifying the error signals by a selected gain with the selectable gain amplifier means defining at least two gains corresponding to the at least two hysteresis bands.

In accordance with another aspect of the present invention, a method of operating a current mode hysteresis controller for controlling a pulse width modulated inverter in response to desired and sensed inverter output currents comprises the steps of: sensing output current in a pulse width modulated inverter circuit to be controlled; generating a reference current representative of the desired current for the sensed motor phase; comparing the sensed output current to the reference current to generate error signals representative of the differences therebetween; generating an inverter current switch signal whenever the error signals exceed a selected hysteresis band surrounding the reference current; defining at least two hysteresis bands surrounding the reference current and corresponding to different reference current magnitudes; and, selecting one of the hysteresis bands.

The step of selecting one of the hysteresis bands preferably is based on the reference current. The step of defining at least two hysteresis bands surrounding the reference current and corresponding to different reference current magnitudes preferably comprises providing selectable gain amplifier means for receiving and amplifying the error signals by a selected gain corresponding to the selected hysteresis band such that the step of selecting one of the hysteresis bands comprises selecting the gain of the selectable gain amplifier means.

It is thus a feature of the present invention to provide an improved method and apparatus for current mode hysteresis control of an inverter circuit; to provide an improved method and apparatus for current mode hysteresis control of an inverter circuit wherein high efficiency and tight control is assured by selecting one of at least two hysteresis bands for control of the inverter; and, to provide an improved method and apparatus for current mode hysteresis control of an inverter circuit wherein high efficiency and tight control is assured by selecting one of at least two hysteresis bands for control of the inverter by selecting the gain of an amplifier circuit used to amplify error signals representative of differences between desired inverter output currents and sensed inverter output currents.

Other features and advantages of the invention will be apparent from the following description, the accompanying drawings and the appended claims.

BRIEF DESCRIPTION OF THE DRAWINGS

FIGS. 3 and 4 are waveforms illustrating operation of an electronic power controller operating with two different hysteresis bands in accordance with the present invention.

DETAILED DESCRIPTION OF THE INVENTION

Figure 1:
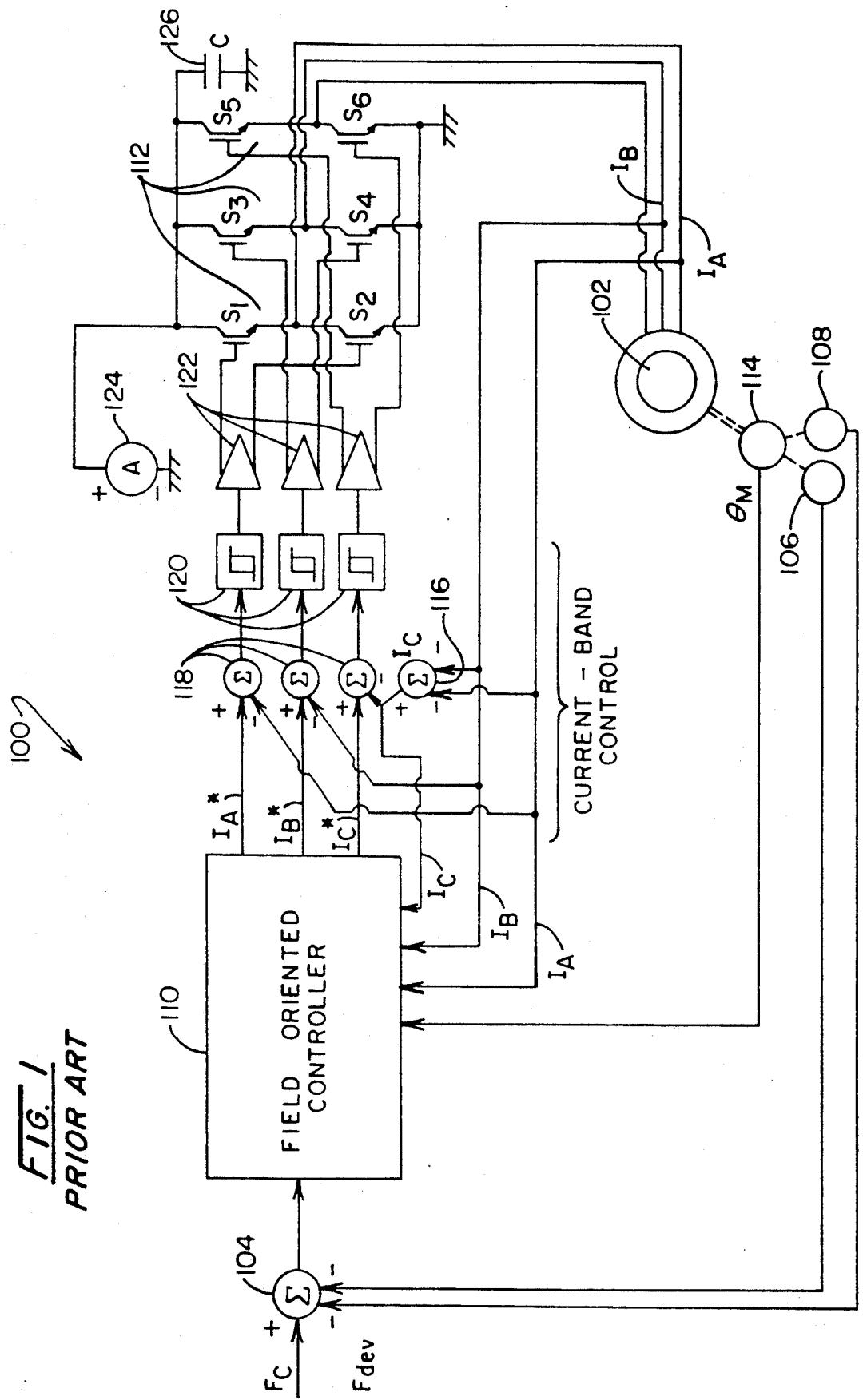
FIG. 1 is a schematic block diagram of an electronic power controller used in an electrically powered active suspension system of the prior art.

While a current mode hysteresis controller operable in accordance with the present invention is generally applicable for use in controlling inverters, it will be described herein with reference to the control of a three phase inverter which in turn controls a three phase AC motor. In particular, the current mode hysteresis controller of the present invention will be described relative to control of three phase AC motors used in an electrically powered active suspension system. FIG. 1 is a schematic block diagram of an AC motor controller 100 used in a prior art electrically powered active suspension system as disclosed in referenced U.S. Pat. No. 5,027,048. One of the AC motor controllers shown in FIG. 1 is used for controlling suspension units for each of the wheels of a motor vehicle.

A centralized system controller (not shown) in the motor vehicle generates force commands for each of the wheels of the vehicle, such as the force command $F_c$ shown in FIG. 1. The AC motor controller 100 must then supply the correct phase currents to AC motor 102, so as to produce the forces specified by the force command $F_c$. A summer or comparator 104 receives the force command $F_c$ from the centralized system controller and adds it to or in other words, compares it with $F_{dev}$. As shown in FIG. 1, $F_{dev}$ is a measured force output derived from load cells 106 or 108 or derived in part by the centralized system controller, using motor current information. The output of the comparator 104 is sent to a field oriented controller 110 which calculates appropriate phase currents to feed to each of the three phase legs 112 which supply the phase currents to the motor 102.

The field oriented controller 110 also receives data from a rotor position sensor 114 which may comprise, for example, an optical encoder. Finally, the field oriented controller 110 senses the currents in the individual windings of the motor 102. Although only the currents $I_A$ and $I_B$ are shown as being sensed directly, with the third current, $I_C$, being derived from currents $I_A$ and $I_B$ by a summer or comparator 116 as the negative of the sum of $I_A$ and $I_B$, those skilled in the art will appreciate that it is possible to directly measure all three of the phase currents as an alternative to the use of the comparator 116. The field oriented controller 110 calculates the desired phase currents $I_A^*$, $I_B^*$, and $I_C^*$. These desired or idealized phase currents are compared by means of comparators 118 to each of the measured phase currents $I_A$, $I_B$, and $I_C$, respectively. The error for each current is then fed to current mode controllers 120. The current mode controllers 120 switch phase currents on and off to provide a predetermined hysteretic current level around the desired phase currents $I_A^*$, $I_B^*$, and $I_C^*$. The outputs of the current mode controllers 120 are fed to drivers 122, which supply gate charges for the purpose of switching transistors S1–S6. The transistors S1 and S2, S3 and S4, S5 and S6, which are labeled 112 in FIG. 1, comprise, respectively, phase legs for supplying three separate phase currents from an alternator 124 and/or capacitor 126 to the motor 102. The outputs of the phase legs are fed directly to the motor 102. For additional information regarding operation of the AC motor controller 100 or the suspension system into which it is incorporated, the reader is referred to referenced U.S. Pat. No. 5,027,048.

A problem is encountered in AC motor controller 100 in terms of the hysteresis band utilized by the current mode controllers 120. The bandwidth of the hysteresis band is defined to provide adequate control of the current level and also to minimize inverter losses. Unfortunately, for applications such as the disclosed active suspension system for a motor vehicle, desired motor current levels vary drastically over a range from 0 current to maximum current for the AC motor 102 such that reference current levels frequently go below the hysteresis band appropriate for high current level operation. Under these conditions, the inverter made up by the transistors S1 and S2, S3 and S4, S5 and S6 coasts, modulation disappears and road disturbances are momentarily not compensated by the suspension system.

Figure 2:
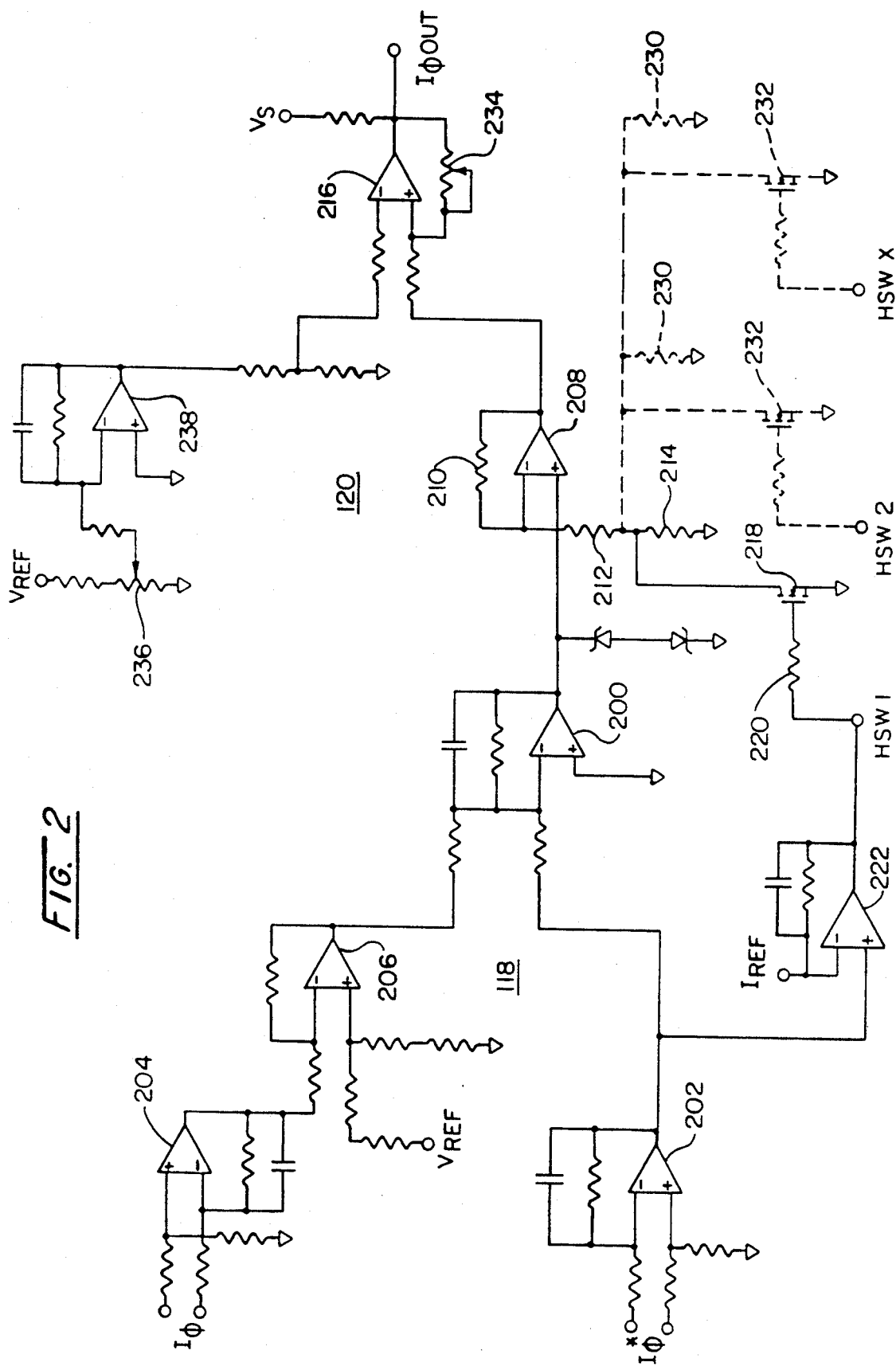
FIG. 2 is a schematic diagram of one phase of the current band control of the electronic power controller of FIG. 1 modified to operate in accordance with the present invention.

To overcome this problem in accordance with the present invention, the current mode controllers 120 are replaced by current mode controllers which include current band control means to define at least two hysteresis bands for the current band controllers 120. In FIG. 2, one current mode controller 120 of FIG. 1 is shown modified to operate in accordance with the present invention to select one of at least two hysteresis bands for the phase current $I_\phi$ to be controlled. As shown in FIG. 2, the comparators 118 each include first comparator means comprising an operational amplifier 200 which sums or compares the desired inverter output current $I_\phi^*$ for the corresponding phase, i.e. the desired phase current for the motor 102, with the sensed inverter output current $I_\phi$, i.e. the sensed phase current for the motor 102, to generate error signals representative of the difference therebetween. The desired inverter output current $I_\phi^*$ is differentially received and amplified by an amplifier 202 to reduce common mode noise before being passed to the amplifier 200. The sensed inverter output current $I_\phi$ is similarly differentially received and amplified by an amplifier 204 to also reduce common mode noise. An amplifier 206 is provided to rescale the sensed inverter output current relative to a precision reference voltage $V_{REF}$ and pass the resulting output signal to the amplifier 200.

The error signals from the amplifier 200 are passed to current band control means comprising an amplifier 208 which amplifies the error signals by an amplification factor determined by resistors 210, 212 and 214 The gain of the amplifier 208 defines the hysteresis band selected in accordance with the illustrated embodiment since upper and lower signal limits for the amplified error signals are determined by second comparator means comprising a comparator 216. While the upper and lower signal limits for the hysteresis bands could be directly selected, as will be apparent to those skilled in the art, it simplifies the resulting circuitry to control the amplification of the error signals and compare the resulting amplified error signals to fixed upper and lower signal limits to define at least two hysteresis bands. In any event, the amplification factor of the amplifier 208 is selectively controlled by means of a transistor 218 which is controlled via a hysteresis switch (HSW1) signal applied through a resistor 220.

In the case of two hysteresis bands, the amplification factor of the amplifier 208 is selected based on the desired inverter output current $I_\phi^*$ for the corresponding phase or the reference current for that phase. The selection in this case can be performed by a comparator 222 which sums or compares the desired inverter output current $I_\phi^*$ with a signal representative of a desired switch reference current $I_{REF}$. Thus, the transistor 218 determines whether the resistor 214 is connected into the gain control circuit for the amplifier 208 or is shorted out and not included in determining the gain. While two hysteresis bands will substantially improve the operation of the AC motor controller 100, it may be desirable for this or other applications to provide more than two hysteresis bands. For operation with more than two hysteresis bands, additional control resistors 230 and corresponding control transistors 232 can be provided and controlled via corresponding hysteresis switch (HSW2-HSWX) signals to define a series of gains for the amplifier 208. While the resistors 214 and 30 have been shown connected in parallel, it will be apparent to those skilled in the art that series connected resistors could also be used to provide selectable gain for the amplifier 208.

Figure 3:
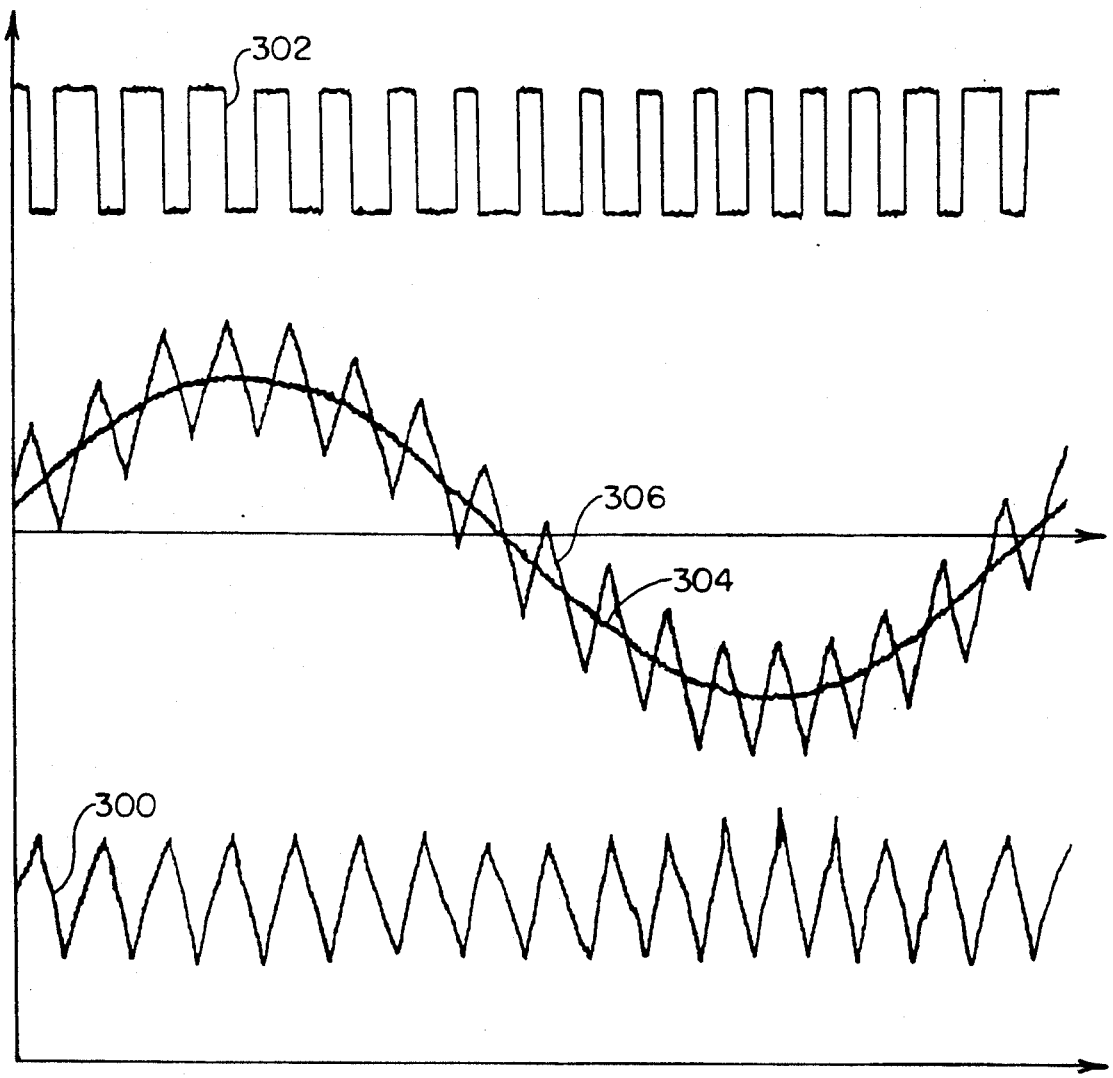

In the disclosed active suspension system, it appears that a switch point of approximately 20 amps is desirable for a two hysteresis band system such that the signal for the desired switch reference current $I_{REF}$ would correspond to 20 amps. Examples of operation of the AC motor controller 100 for an experimental embodiment wherein two hysteresis bands of 16 amps ($\pm 8$ amps) and 4 amps ($\pm 2$ amps) are provided, respectively, are illustrated in the waveforms of FIGS. 3 and 4. Waveforms 300 and 400 illustrate error inputs to the comparator 216; waveforms 302 and 402 illustrate resulting output signals from the comparator 216; waveforms 304 and 404 illustrate the desired inverter output current $I_\phi^*$; and, waveforms 306 and 406 illustrate the sensed inverter output current $I_\phi$.

In the illustrated embodiment of the present invention shown in FIG. 2, the upper and lower limits to which the amplified error signals are compared are substantially fixed for a given application. However, the limits can be selected within defined ranges. The upper limit for the comparison to the amplified error signals performed by the amplifier 216 is defined by the setting of a potentiometer 234. The lower limit for the comparison to the amplified error signals performed by the amplifier 216 is defined by the setting of a potentiometer 236 in cooperation with an amplifier 238 and the precision reference voltage $V_{REF}$. The potentiometer 234 defines the width of the hysteresis window and the potentiometer 236 and precision reference voltage $V_{REF}$ adjusts the symmetry of the hysteresis window.

While the method of operating a current mode hysteresis controller in accordance with the present invention should be apparent from the foregoing description of apparatus operable in accordance with the method, for sake of clarity the method will now be briefly described. The method of operating a current mode hysteresis controller for controlling a pulse width modulated inverter in response to desired and sensed inverter output currents comprises the steps of: sensing output current in a pulse width modulated inverter circuit to be controlled; generating a reference current representative of the desired current for the sensed motor phase; comparing the sensed output current to the reference current to generate error signals representative of the differences therebetween; generating an inverter current switch signal whenever the error signals exceed a selected hysteresis band surrounding the reference current; defining at least two hysteresis bands surrounding the reference current and corresponding to different reference current magnitudes; and, selecting one of the hysteresis bands.

The step of selecting one of the hysteresis bands preferably is based on the reference current. The step of defining at least two hysteresis bands surrounding the reference current and corresponding to different reference current magnitudes preferably comprises providing selectable gain amplifier means for receiving and amplifying the error signals by a selected gain corresponding to the selected hysteresis band such that the step of selecting one of the hysteresis bands comprises selecting the gain of the selectable gain amplifier means.

Having thus described the method and apparatus of the present invention in detail and by reference to preferred embodiments thereof, it will be apparent that modifications and variations are possible without departing from the scope of the invention defined in the appended claims.

What is claimed is:

1. A current mode hysteresis controller for controlling a pulse width modulated inverter in response to desired and sensed inverter output currents comprising:

first comparator means for comparing said desired and sensed inverter output currents to one another to generate error signals representative of the differences therebetween;

second comparator means for receiving said error signals and comparing them to upper and lower limits of a selected hysteresis band, said second comparator means switching the state of an output signal whenever said signals reach the boundaries of said selected hysteresis band;

current band control means for defining at least two hysteresis bands for said second comparator means; and selector means for selecting said selected hysteresis band from said at least two hysteresis bands.

2. A current mode hysteresis controller for controlling a pulse width modulated inverter in response to desired and sensed inverter output currents as claimed in claim 1 wherein said current band control means comprises selectable gain amplifier means for receiving and amplifying said error signals by a selected gain.

3. A current mode hysteresis controller for controlling a pulse width modulated inverter in response to desired and sensed inverter output currents as claimed in claim 2 wherein said selectable gain amplifier means defines at least two gains corresponding to said at least two hysteresis bands.

4. A method of operating a current mode hysteresis controller for controlling a pulse width modulated inverter in response to desired and sensed inverter output currents comprising the steps of:

sensing output current in a pulse width modulated inverter circuit to be controlled;

generating a reference current representative of the desired current for the sensed motor phase;

comparing said sensed output current to said reference current to generate error signals representative of the differences therebetween;

generating an inverter current switch signal whenever said error signals exceed a selected hysteresis band surrounding said reference current;

defining at least two hysteresis bands surrounding said reference current and corresponding to different reference current magnitudes; and selecting one of said hysteresis bands.

5. A method of operating a current mode hysteresis controller for controlling a pulse width modulated inverter in response to desired and sensed inverter output currents as claimed in claim 4 wherein the step of selecting one of said hysteresis bands is based on said reference current.

6. A method of operating a current mode hysteresis controller for controlling a pulse width modulated inverter in response to desired and sensed inverter output currents as claimed in claim 4 wherein the step of defining at least two hysteresis bands surrounding said reference current comprises the step of providing selectable gain amplifier means for receiving and amplifying said error signals by a selected gain corresponding to said selected hysteresis band.

7. A method of operating a current mode hysteresis controller for controlling a pulse width modulated inverter in response to desired and sensed inverter output currents as claimed in claim 6 wherein the step of selecting one of said hysteresis bands comprises selecting the gain of said selectable gain amplifier means.

* * * * *